United States Patent [19]
Ettori

[11] Patent Number: 5,261,148
[45] Date of Patent: Nov. 16, 1993

[54] ROTARY VICE FOR ROTARY TABLE

[76] Inventor: Ignazio Ettori, Via San Lorenzo 39, 25060 - Cogozzo Di Villa Carcina (Brescia), Italy

[21] Appl. No.: 983,657

[22] Filed: Dec. 1, 1992

[30] Foreign Application Priority Data

Dec. 3, 1991 [IT] Italy .............................. MI91A-03230

[51] Int. Cl.$^5$ .......................... B23Q 7/02; B65H 1/00
[52] U.S. Cl. ................................. 29/38 B; 29/38 A; 198/378; 414/225
[58] Field of Search .................... 29/563, 38 A, 38 B, 29/38 R; 74/825; 409/165; 414/225; 198/803.3, 803.15, 377, 378

[56] References Cited

U.S. PATENT DOCUMENTS

| 2,876,527 | 3/1959 | Matlachowsky | 29/38 B |
| 3,322,095 | 5/1967 | Gelbjerg-Hansen et al. | 198/378 X |
| 4,798,276 | 1/1989 | Coeffler | 198/378 |
| 4,860,414 | 8/1989 | Bishop et al. | 29/38 C |
| 5,151,001 | 9/1992 | Kawaguchi | 414/225 |

FOREIGN PATENT DOCUMENTS

| 46883 | 3/1982 | European Pat. Off. | 29/38 A |
| 4526793 | 3/1970 | Japan | 29/38 A |
| 192453 | 8/1986 | Japan | 29/563 |
| 539739 | 6/1977 | U.S.S.R. | 29/38 A |

Primary Examiner—William Briggs
Attorney, Agent, or Firm—Bucknam and Archer

[57] ABSTRACT

The present invention relates to a rotary vice construction which can be specifically applied on the rotary table of a transfer machining apparatus, which vice comprises a first and second bodies, opposite to one another and forming a vice assembly adapted to hold a workpiece to be machined, which is supported by a rotary table. Inside each of the vice bodies there is rotatably supported a supporting shaft which supports the vice jaws for holding the workpiece, a removably locking ring element being moreover provided in each body for the rotation of the shaft, which can be disengaged by means of a hydraulic cylinder, and to each shaft, on the side thereof opposite to the jaws, there is keyed a gear element which can be removably connected to an outer drive assembly in order to rotate the shaft.

5 Claims, 3 Drawing Sheets

5,261,148

ROTARY VICE FOR ROTARY TABLE

BACKGROUND OF THE INVENTION

The present invention relates to a rotary vice which can be specifically applied on the rotary table of a transfer machining apparatus.

As is known, prior rotary-table transfer apparatus, including for example a vertical table having a horizontal rotary axis, there subsists frequently the need of causing the workpieces to be turned, said workpieces being mounted on the apparatus table according to preset axes, so as to subsequently perform thereon the several desired machining operations.

At present the adopted approaches have been found to be rather unsatisfactory and involve great constructional problems, mainly with respect to the arrangement of the means for removably preventing the workpiece from being rotated, and the means provided for rotatably driving said workpiece, according to preset angles and procedures.

SUMMARY OF THE INVENTION

Accordingly, the aim of the present invention is to overcome the above mentioned drawbacks, by providing a rotary vice which can be specifically applied on a rotary table of a transfer machining apparatus, which allows a workpiece to be easily and quickly locked and unlocked by means which do not hinder the provided machining operations.

Within the above mentioned aim, a main object of the present invention is to provide such a rotary vice in which the hydraulic circuit for controlling the cylinder assembly for unlocking the angular divider of the rotary jaws of the vice is completely arranged inside the rotary vice.

Another object of the present invention is to provide such a rotary vice which is very reliable and safe in operation.

Yet another object of the present invention is to provide such a vice which can be easily made starting from easily available elements and materials and which, moreover, is very competitive from a mere economic standpoint.

According to one aspect of tile present invention, the above mentioned aim and objects, as well as yet other objects, which will become more apparent hereinafter, are achieved by a rotary vice, provided for application on a rotary table of a transfer machining apparatus, characterized in that said vice comprises a first and second opposite vice bodies, cooperating for holding therebetween a workpiece to be machined, said vice being supported on a rotary table of said apparatus, inside each said body there being rotatably supported a shaft in turn supporting a jaw element for holding the workpiece, a removable locking ring element being moreover provided for locking said shaft, hydraulic cylinder means being also provided for disengaging said locking ring element, gear means being connected to one of said shaft, on a side thereof, opposite to said jaw, said gear means being provided for connection with an outer divider assembly for rotating said shaft.

BRIEF DESCRIPTION OF THE DRAWINGS

Further characteristics and advantages of the invention will become more apparent from the following detailed disclosure of a preferred, though not exclusive, embodiment thereof, which is illustrated, by way of an indicative, but not limitative example, in the figures of the accompanying drawings, where.

DESCRIPTION OF THE PREFERRED EMBODIMENT

Figure 1:
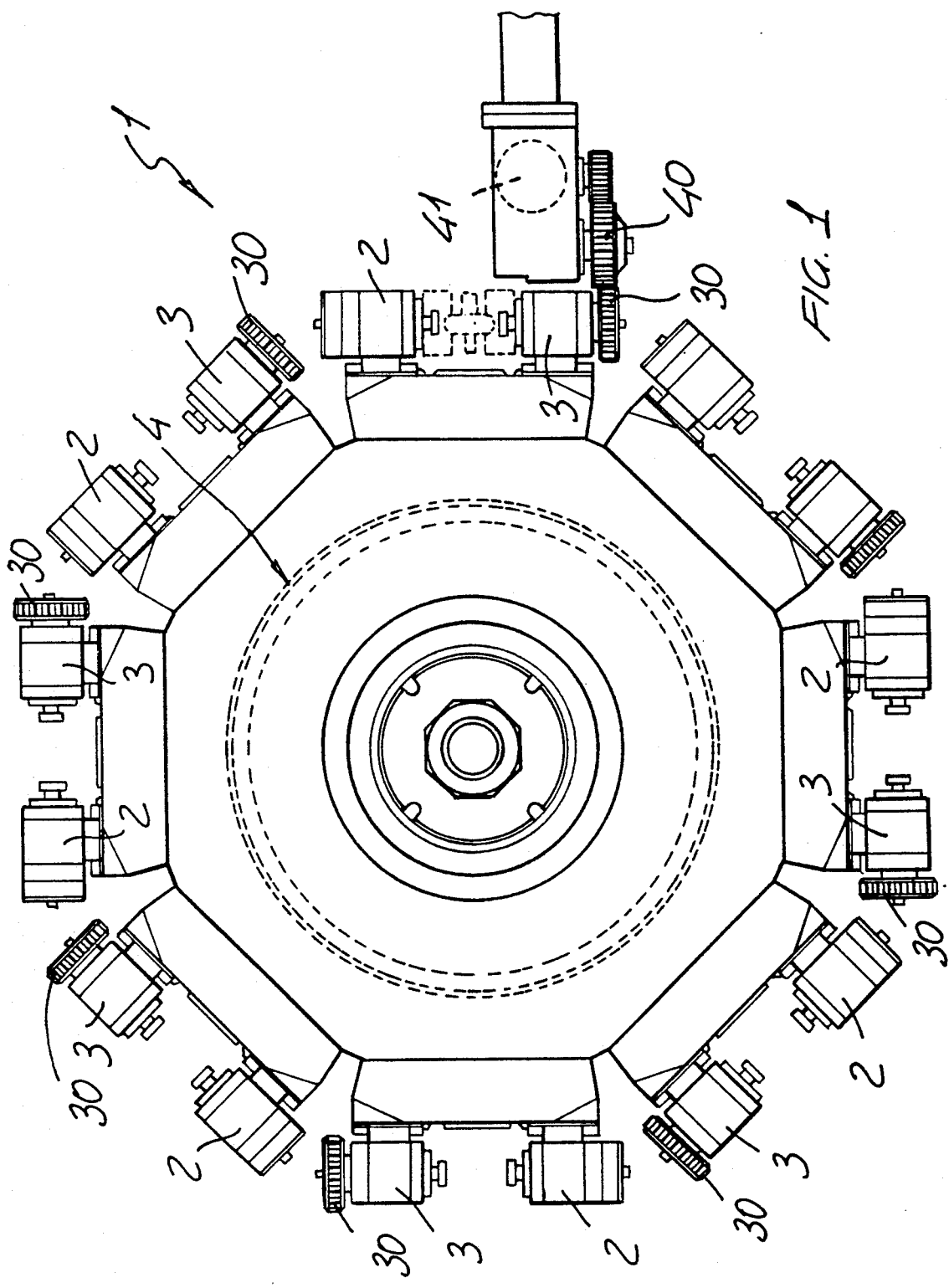
FIG. 1 is a schematic front view illustrating the rotary table on which there is applied the rotary vice according to the present invention.
Figure 2:
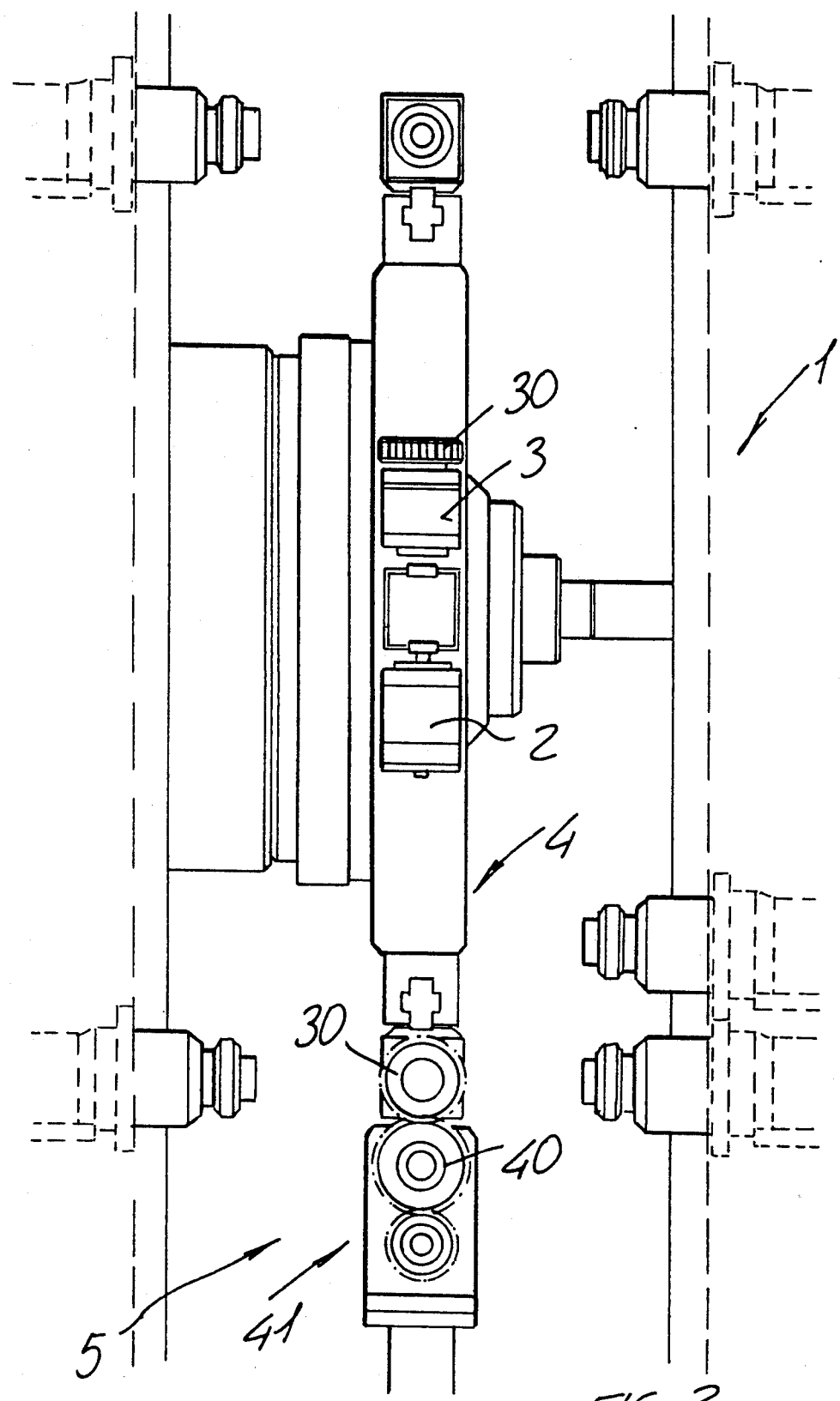
FIG. 2 is a schematic elevation view illustrating the transfer apparatus with the related rotary table.
Figure 3:
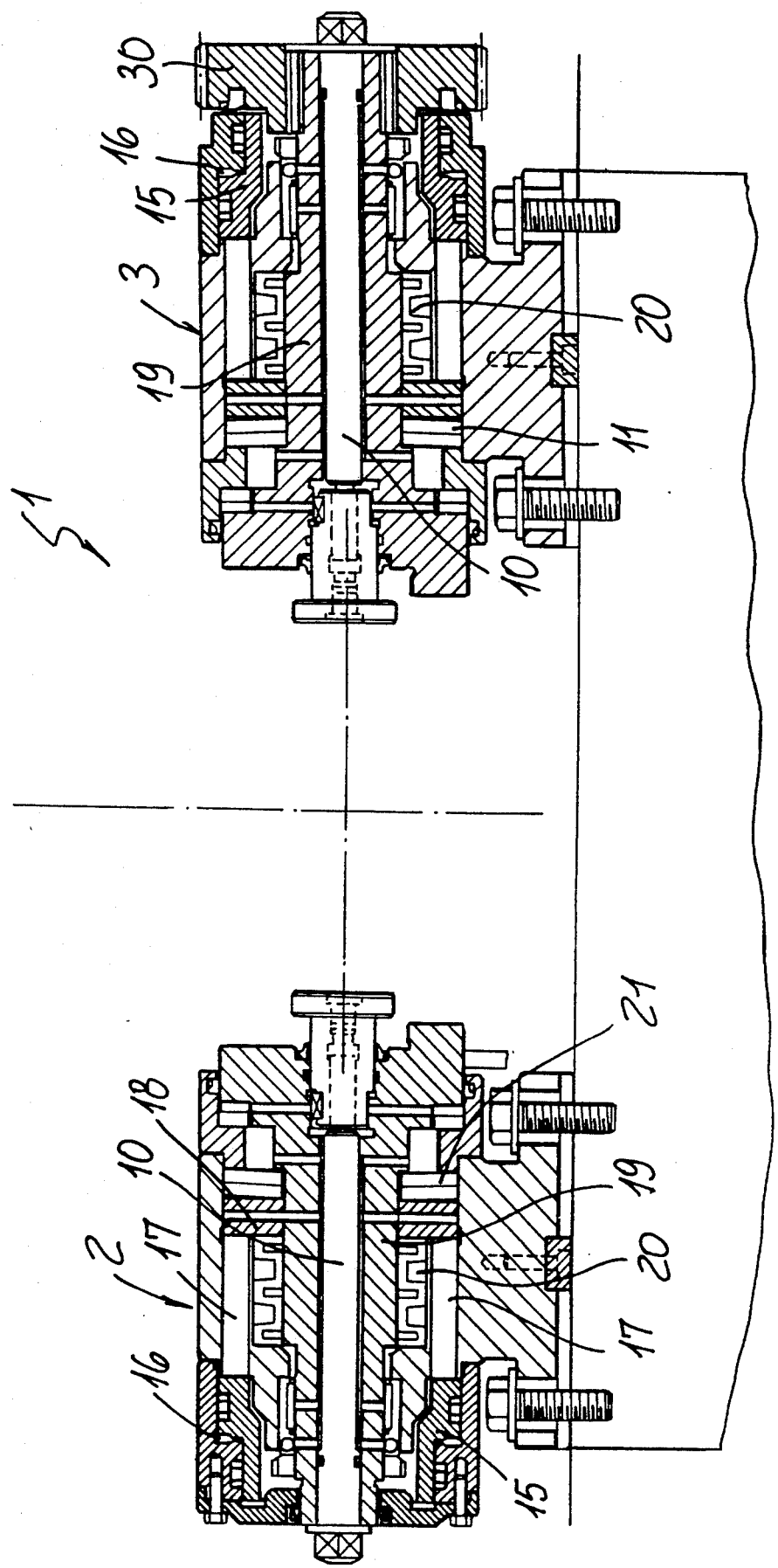
FIG. 3 is a schematic cross-sectional view illustrating the rotary vice.

With reference to the number references of the figures of the accompanying drawings, the rotary vice construction, specifically designed for application on the rotary table of a transfer machining apparatus, according to the present invention, which has been generally indicated at the reference number 1, comprises a first and second vice bodies, respectively 2 and 3, which are connected to the rotary table 4 of a transfer machining apparatus.

Each body 2 and 3 rotatably supports, in its inside, a shaft 10 which, at one end thereof, projecting from the body 1, supports jaw elements which can be of any suitable types.

The opposite bodies 2 and 3 practically provide a rotary vice which has aligned axes 10.

If with the word "front portion" there are called the mutually opposite portions of the bodies 2 and 3, then at the rear portion of each body there is provided a piston 15, which can be connected to a hydraulic circuit, which is tightly housed in a chamber 16, defined inside the body and, at its front axial end portion operating on pins 17 which, at the other end portion, engage with a block 18 which is keyed on the shaft 10 through the interposition of a sleeve 19 also keyed on the shaft 10.

On the block 18 operates a pressure spring 21 which operates by pressure on the locking ring element 20, in order to lock the shaft with respect to the related body in which the shaft is arranged.

On one of the shafts 10 and, making specific reference to the drawings, on the shaft 10 of the body 3, there is keyed an outer gear 30, which is adapted to be removably coupled with the gear 40 of an outer drive assembly, indicated at the reference number 41.

With the disclosed arrangement, as the chamber 16 is pressurized, the piston 15 will be caused to translate and, by overcoming the resilient biassing action provided by the cup springs 21, it will remove the axial compression on the locking ring 20, thereby the shaft will be free of rotating.

Owing to the connection with the drive assembly, it will be possible to cause said shaft to rotate as desired.

In order to lock the shaft, it is sufficient to remove the pressure from the chamber 16, so as to cause the cup springs 21 to axially press on the locking ring, so as to hold said shaft in a set locked position.

It should be apparent that the shaft can either rotate with respect to the body 2 or 3, or can be locked, and it can also be provided, at the end portion thereof or in its inside, with suitable fittings for connection with other devices, such as, for example clamp assemblies, drive assemblies for quickly engaging or disengaging the clamps, sensors, cams, transducers, and the like.

The rotation of the shaft is applied from outside by means of a gear transmission and the shaft, which is supported by suitable bearings, as is rotated, affords the possibility of re-arranging a workpiece at well defined angular position, or causing the workpiece to be fed with an angular type of motion, or it is also adapted to cause said workpiece to turn.

The locking is obtained by means of the above mentioned locking ring which is compressed by the pack springs 21.

Thus, by the disclosed ring element, the shaft can be easily and quickly locked.

The locking ring element, in addition to angularly locking the shaft, will subject said shaft to an axial force, which will be discharged on the main thrust bearing, and will be added to the forces already operating on this bearing because of the workpiece locking effect provided by the vice.

As stated, the shaft is unlocked by removing the axial pressure of the bush by means of the pins 17 which affect the, block arranged at the pack springs.

This provision affords the possibility of arranging hydraulic cylinders at the rear of the shaft and outside of the framework of the apparatus.

The front region is that where operates the expansion bush and where there are arranged the bearings for properly locating the shaft.

Since the unlocking cylinder is not arranged at the front of the apparatus, the shaft can be located with a very great accuracy, both during its turning movements and during its indexing movements.

The outer drive assembly 41 substantially comprises a device which provides four functions, that is an approaching, by means of a numeric control unit, which allows the mechanic drive to be arranged with a sufficient accuracy, with respect to the divider device, and causes the gear 30 to mesh with the gear wheel 41, in a ripetitive way and with a very good accuracy, both with respect to the gear inter-axes and with respect to the load acting thereon.

Moreover, it is possible to easily wash the gear teeth and the locking and reference surface, by means of suitable nozzles.

The centering operation is performed by a suitable means allowing the mechanical drive to be located with a sufficient precision with respect to divider device.

Moreover, the rotation of the clamps is performed by a numeric control unit, having a transducer which is rigidly connected to the last wheel of the gear wheel chain.

The wheel, which directly engages with the outer gear 30, connected to the rotary clamps, as stated, provides the possibility of obtaining several movements, such as an angular feeding movement, an indexing movement, to an infinite series of angular positions, as well as of holding the workpiece locked in the vice.

The invention as disclosed is suceptible to several modifications and variations all of which will come within the scope of the inventive idea.

Moreover,, all of the details can be replaced by other technically equivalent elements.

In practicing the invention, the used materials, as well as the contingent size and shape, can be any, according to requirements.

I claim:

1. A rotary vice, provided for application on a rotary table of a transfer machining apparatus, characterized in that said vice comprises a first and second opposite vice bodies, cooperating for holding therebetween a workpiece to be machined, said vice being supported on a rotary table of said apparatus, inside each said body there being rotatably supported a shaft in turn supporting a jaw element for holding the workpiece, a removable locking ring element being moreover provided for locking said shaft, hydraulic cylinder means being provided for disengaging said locking ring element, gear means being connected to one of said shaft, on a side thereof, opposite to said jaw, said gear means being provided for connection with an outer divider assembly for rotating said shaft.

2. A rotary vice, according to claim 1, characterized in that the hydraulic cylinder is housed in said body on a side thereof opposite to the jaw forming end portions.

3. A rotary vice, according to claim 2, characterized in that said hydraulic cylinder operates, at a front end portion thereof, on pin means engaging with a block element which is rotatively rigid with said shaft, on said block operating pressure springs for axially pressing said locking ring.

4. A rotary vice, according to claim 3, characterized in that said locking ring operates between the inside of the body and the outer surface of a sleeve which is rigidly connected to said shaft.

5. A rotary vice, according to claim 1, characterized in that the drive assembly of said shaft is so arranged as to provide an approaching displacement for coupling with the outer gear, a washing of the gear teeth, a centering operation, and being moreover adapted to provide a rotary drive according to a plurality of preset angular positions, and a continuous rotary movement.

* * * * *